(12) United States Patent
Arshad et al.

(10) Patent No.: US 12,461,268 B2
(45) Date of Patent: Nov. 4, 2025

(54) DETERMINING HYDROCARBON PRODUCTION ZONES IN A SUBTERRANEAN RESERVOIR

(71) Applicant: Saudi Arabian Oil Company, Dhahran (SA)

(72) Inventors: Waheed Syed Arshad, Mississauga (CA); Otto E. Meza Camargo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 412 days.

(21) Appl. No.: 17/897,917

(22) Filed: Aug. 29, 2022

(65) Prior Publication Data

US 2024/0069238 A1    Feb. 29, 2024

(51) Int. Cl.
    *G01V 1/50*    (2006.01)
    *E21B 43/26*    (2006.01)
    (Continued)

(52) U.S. Cl.
    CPC ................ *G01V 1/50* (2013.01); *E21B 43/26* (2013.01); *E21B 47/07* (2020.05); *E21B 47/103* (2020.05); *E21B 47/107* (2020.05); *E21B 49/00* (2013.01); *G01V 1/46* (2013.01); *G01V 20/00* (2024.01); *E21B 2200/20* (2020.05); *G01V 2210/646* (2013.01)

(58) Field of Classification Search
    CPC . G01V 1/50; G01V 1/46; G01V 20/00; G01V 2210/646; G01V 2210/1234; E21B 43/26; E21B 47/07; E21B 47/103; E21B 47/107; E21B 49/00; E21B 2200/20
    USPC .......................................................... 702/11
See application file for complete search history.

(56) References Cited

U.S. PATENT DOCUMENTS

| | | |
|---|---|---|
| 9,062,545 B2 | 6/2015 | Roberts et al. |
| 10,001,003 B2 | 6/2018 | Dusseault et al. |

(Continued)

FOREIGN PATENT DOCUMENTS

RU    2404359    11/2010

OTHER PUBLICATIONS

U.S. Appl. No. 17/195,528, filed Mar. 21, 2008, Arshad et al.
(Continued)

*Primary Examiner* — Aditya S Bhat
(74) *Attorney, Agent, or Firm* — Fish & Richardson P.C.

(57) ABSTRACT

Techniques for determining one or more hydrocarbon production zones in a subterranean reservoir include generating a 3D natural fracture model that includes a 3D discrete fracture network and a brittleness model for a subterranean formation into which a wellbore is formed; converting the 3D discrete fracture network into a 2D model to determine a continuous fracture density property; predicting a plurality of fluid-flow pathways using the continuous fracture density property modeled for each brittleness; hydraulic fracturing the wellbore to create one or more hydraulic fractures in the subterranean formation; subsequent to the hydraulic fracturing, logging the wellbore to determine one or more logged properties; identifying one or more fracture flow zones (Continued)

based on the one or more logged properties; and validating the predicted plurality of fluid-flow pathways based on the identified one or more fracture flow zones.

24 Claims, 11 Drawing Sheets

(51) Int. Cl.
    *E21B 47/07*     (2012.01)
    *E21B 47/103*     (2012.01)
    *E21B 47/107*     (2012.01)
    *E21B 49/00*     (2006.01)
    *G01V 1/46*     (2006.01)
    *G01V 20/00*     (2024.01)

(56) References Cited

U.S. PATENT DOCUMENTS

| | | |
|---|---|---|
| 10,607,043 B2 | 3/2020 | Camargo et al. |
| 10,983,233 B2 | 4/2021 | Maucec et al. |
| 11,098,582 B1 | 8/2021 | Camargo et al. |
| 11,125,671 B2 | 9/2021 | Santagati et al. |
| 11,434,759 B2 | 9/2022 | Awan et al. |
| 2017/0275970 A1 | 9/2017 | Crawford et al. |
| 2018/0016895 A1* | 1/2018 | Weng .................. G01V 1/306 |
| 2019/0080122 A1 | 3/2019 | Camargo et al. |
| 2020/0095858 A1 | 3/2020 | Bouaouaja et al. |
| 2020/0292722 A1 | 9/2020 | Maucec et al. |
| 2021/0010922 A1 | 1/2021 | Santagati et al. |
| 2021/0156248 A1 | 5/2021 | Mahmood et al. |
| 2021/0254458 A1 | 8/2021 | Camargo et al. |
| 2021/0302619 A1 | 9/2021 | Arshad et al. |
| 2022/0010678 A1 | 1/2022 | Awan et al. |
| 2022/0107433 A1 | 4/2022 | Maucec et al. |
| 2022/0341835 A1* | 10/2022 | Camargo .............. G01N 15/088 |

OTHER PUBLICATIONS

U.S. Appl. No. 17/745,542, filed May 16, 2022, Arshad et al.
U.S. Appl. No. 17/949,626, filed Sep. 21, 2022, Arshad et al.
U.S. Appl. No. 17/949,651, filed Sep. 21, 2022, Arshad et al.
U.S. Appl. No. 17/950,803, filed Sep. 22, 2022, Arshad et al.
Al-Hawas et al., "Delineation of Fracture Anisotropy Signatures in Wudayhi Field by azimuthal seismic data," The Leading Edge, Dec. 2003, 9 pages.
Aslanyan et al., "Integrated Formation Micro-Imager (FMI) and Spectral Noise Logging (SNL) for the Study of Fracturing in Carbonate Reservoirs," SPE-177616, presented at the Abu Dhabi International Petroleum Exhibition and Conference, Abu Dhabi, UAE, Nov. 2015, 15 pages.
Barton et al., "Fluid flow along potentially active faults in crystalline rock," Geology, 23(8):683-686, 5 pages.
Castiblanco et al., "Evaluation of Hydraulic Fracturing Effectiveness by Combined Analysis of Spectral Noise Logging and High Precision Temperature Logging data and Subsequent Numerical Temperature Modelling," SPE-191446, presented at the SPE International Hydraulic Fracturing Technology Conference and Exhibition, Muscat, Oman, Oct. 2018, 15 pages.
Gray et al., "Fracture Detection in the Manderson Field: A 3D AVAZ Case History," The Leading Edge, 19(11):1214-1221, 5 pages.
Luthi, "Fracture apertures from electrical borehole scans," Geophysics, 1990, 55:821-833, 13 pages.
Miller et al., "Evaluation of Production Log Data from Horizontal Wells Drilled in Organic Shales," SPE-144326, presented at the SPE North American Unconventional Gas Conference and Exhibition, The Woodlands, Texas, USA, Jun. 2011, 23 pages.
SAIP Examination Report in Saudi Arabian Appln. No. 123450236, dated Mar. 20, 2025, 10 pages (with English translation).

* cited by examiner

DETERMINING HYDROCARBON PRODUCTION ZONES IN A SUBTERRANEAN RESERVOIR

TECHNICAL FIELD

The present disclosure describes apparatus, systems, and methods for determining one or more hydrocarbon production zones in a subterranean reservoir.

BACKGROUND

In some cases, one-third of perforation clusters do not yield oil or gas. Knowing where to appropriately place perforations and also determine the best hydraulic fracturing stages still remains a challenge for the oil and gas industry. The industry has progressed considerably from the early stages of choosing a geometric perforation cluster scheme to a more sophisticated workflow with enhanced production-based weighted criteria such as facies quality, effective porosity, and brittleness to quantify the differences in reservoir character and a separate set of fracturing-based weighted criteria such as closure stress, natural fracture index, and cement bond index to highlight areas of differing mechanical properties or mechanical risk. Even after having these elaborate weighted criteria, the wells face formation breakdown issues and poor productivity.

SUMMARY

In an example implementation, a method for determining one or more hydrocarbon production zones in a subterranean reservoir includes generating, with one or more hardware processors of a control system, a 3D natural fracture model that includes a 3D discrete fracture network and a brittleness model for a subterranean formation into which a wellbore is formed; converting, with the one or more hardware processors, the 3D discrete fracture network into a 2D model to determine a continuous fracture density property; predicting, with the one or more hardware processors, a plurality of fluid-flow pathways using the continuous fracture density property modeled for each brittleness; hydraulic fracturing the wellbore to create one or more hydraulic fractures in the subterranean formation; subsequent to the hydraulic fracturing, logging the wellbore to determine one or more logged properties; identifying, with the one or more hardware processors, one or more fracture flow zones based on the one or more logged properties; and validating, with the one or more hardware processors, the predicted plurality of fluid-flow pathways based on the identified one or more fracture flow zones.

In an aspect combinable with the example implementation, the subterranean formation comprises a plurality of natural fractures, and the 3D discrete fracture network comprises the plurality of natural fractures.

In another aspect combinable with any of the previous aspects, logging the wellbore to determine one or more logged properties comprises performing at least one high precision temperature (HPT) logging run to generate at least one HPT log of the wellbore; and performing at least one spectral noise logging (SNL) run to generate at least one spectral noise log of the wellbore.

In another aspect combinable with any of the previous aspects, performing at least one spectral noise logging (SNL) run to generate at least one spectral noise log of the wellbore comprises performing a first SNL run at flowing conditions of the wellbore to generate a first spectral noise log of the wellbore; and performing a second SNL run at shut-in conditions of the wellbore to generate a second spectral noise log of the wellbore.

Another aspect combinable with any of the previous aspects further includes generating a composite log that includes a fracture density index, the predicted plurality of fluid-flow pathways, the at least one HPT log, and the at least one spectral noise log of the wellbore; and comparing, with the one or more hardware processors, the predicted plurality of fluid-flow pathways with portions of the at least one HPT log, and the at least one spectral noise log associated with the one or more hydraulic fractures in the subterranean formation.

In another aspect combinable with any of the previous aspects, comparing the predicted plurality of fluid-flow pathways with portions of the at least one HPT log, and the at least one spectral noise log associated with the one or more hydraulic fractures in the subterranean formation comprises matching, with the one or more hardware processors, wellbore depths of the predicted plurality of fluid-flow pathways with wellbore depths on at least one of the HPT log or the spectral noise log that are associated with fluid flow through the one or more hydraulic fractures of the wellbore.

In another aspect combinable with any of the previous aspects, the predicted plurality of fluid-flow pathways are marked as tadpoles on the composite log.

Another aspect combinable with any of the previous aspects further includes calibrating, with the one or more hardware processors, the plurality of fluid-flow pathways based on the identified one or more fracture flow zones.

In another example implementation, a computer-implemented method performed with one or more hardware processors includes generating, with one or more hardware processors of a control system, a 3D natural fracture model that includes a 3D discrete fracture network and a brittleness model for a subterranean formation into which a wellbore is formed; converting, with the one or more hardware processors, the 3D discrete fracture network into a 2D model to determine a continuous fracture density property; predicting, with the one or more hardware processors, a plurality of fluid-flow pathways using the fracture density property modeled for each brittleness; generating, with the one or more hardware processors, one or more logs of one or more logged properties of the wellbore subsequent to a hydraulic fracturing and logging operation of the wellbore; identifying, with the one or more hardware processors, one or more fracture flow zones based on the one or more logged properties; and validating, with the one or more hardware processors, the predicted plurality of fluid-flow pathways based on the identified one or more fracture flow zones.

In an aspect combinable with the example implementation, the subterranean formation comprises a plurality of natural fractures, and the 3D discrete fracture network comprises the plurality of natural fractures.

In another aspect combinable with any of the previous aspects, the one or more logs comprise at least one high precision temperature (HPT) log of the wellbore such that a first logged property is wellbore fluid temperature; and at least one spectral noise log of the wellbore such that a second logged property is wellbore fluid spectral noise.

In another aspect combinable with any of the previous aspects, the at least one spectral noise log of the wellbore comprises a first spectral noise log of the wellbore at wellbore flowing fluid conditions; and a second spectral noise log of the wellbore at wellbore shut-in conditions.

Another aspect combinable with any of the previous aspects further includes generating, with the one or more hardware processors, a composite log that includes a fracture density index, the predicted plurality of fluid-flow pathways, the at least one HPT log, and the at least one spectral noise log of the wellbore; and comparing, with the one or more hardware processors, the predicted plurality of fluid-flow pathways with portions of the at least one HPT log, and the at least one spectral noise log associated with the one or more hydraulic fractures in the subterranean formation.

In another aspect combinable with any of the previous aspects, comparing the predicted plurality of fluid-flow pathways with portions of the at least one HPT log, and the at least one spectral noise log associated with the one or more hydraulic fractures in the subterranean formation comprises matching, with the one or more hardware processors, wellbore depths of the predicted plurality of fluid-flow pathways with wellbore depths on at least one of the HPT log or the spectral noise log that are associated with fluid flow through the one or more hydraulic fractures of the wellbore.

In another aspect combinable with any of the previous aspects, the predicted plurality of fluid-flow pathways are marked as tadpoles on the composite log.

Another aspect combinable with any of the previous aspects further includes calibrating, with the one or more hardware processors, the plurality of fluid-flow pathways based on the identified one or more fracture flow zones.

In another example implementation, a computing system includes one or more memory modules that store instructions; and one or more hardware processors communicably coupled to the one or more memory modules and configured to execute the instructions to perform operations. The operations include generating a 3D natural fracture model that includes a 3D discrete fracture network and a brittleness model for a subterranean formation into which a wellbore is formed; converting the 3D discrete fracture network into a 2D model to determine a continuous fracture density property; predicting a plurality of fluid-flow pathways using the fracture density property modeled for each brittleness; generating one or more logs of one or more logged properties of the wellbore subsequent to a hydraulic fracturing and logging operation of the wellbore; identifying one or more fracture flow zones based on the one or more logged properties; and validating the predicted plurality of fluid-flow pathways based on the identified one or more fracture flow zones.

In an aspect combinable with the example implementation, the subterranean formation comprises a plurality of natural fractures, and the 3D discrete fracture network comprises the plurality of natural fractures.

In another aspect combinable with any of the previous aspects, the one or more logs comprise at least one high precision temperature (HPT) log of the wellbore such that a first logged property is wellbore fluid temperature; and at least one spectral noise log of the wellbore such that a second logged property is wellbore fluid spectral noise.

In another aspect combinable with any of the previous aspects, the at least one spectral noise log of the wellbore comprises a first spectral noise log of the wellbore at wellbore flowing fluid conditions; and a second spectral noise log of the wellbore at wellbore shut-in conditions.

In another aspect combinable with any of the previous aspects, the operations further comprise generating a composite log that includes a fracture density index, the predicted plurality of fluid-flow pathways, the at least one HPT log, and the at least one spectral noise log of the wellbore; and comparing the predicted plurality of fluid-flow pathways with portions of the at least one HPT log, and the at least one spectral noise log associated with the one or more hydraulic fractures in the subterranean formation.

In another aspect combinable with any of the previous aspects, the operation of comparing the predicted plurality of fluid-flow pathways with portions of the at least one HPT log, and the at least one spectral noise log associated with the one or more hydraulic fractures in the subterranean formation comprises matching wellbore depths of the predicted plurality of fluid-flow pathways with wellbore depths on at least one of the HPT log or the spectral noise log that are associated with fluid flow through the one or more hydraulic fractures of the wellbore.

In another aspect combinable with any of the previous aspects, the predicted plurality of fluid-flow pathways are marked as tadpoles on the composite log.

In another aspect combinable with any of the previous aspects, the operations further comprise calibrating the plurality of fluid-flow pathways based on the identified one or more fracture flow zones.

Implementations of apparatus, systems, and methods for determining one or more hydrocarbon production zones in a subterranean reservoir according to the present disclosure may include one or more of the following features. For example, aspects of the present disclosure can predict a presence of special flow-paths defined as critical stress fractures, which conventionally, cannot be physically captured on normal logs but are modeled. As another example, aspects of the present disclosure further validate the presence of the critical fractures by being able to physically capture them through actual fluid movement (for example, behind a casing) on logged parameters from areas that were predicted in a model. Aspects of the present disclosure can provide for physical measurements of fracture contributions, which further serves to calibrate three-dimensional fracture models. As another example, aspects of the present disclosure can provide a robust procedure for choosing the best intervals for perforating to ensure elimination of wasted perforations, help reduce inconsistent breakdown and treating pressures, minimize proppant screen-out situations, and generally not waste money fracturing non-productive rock. For instance, through a determination of the best perforation intervals, higher productivity wells and the ability to compare production between a well and its offset wells can be delivered.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
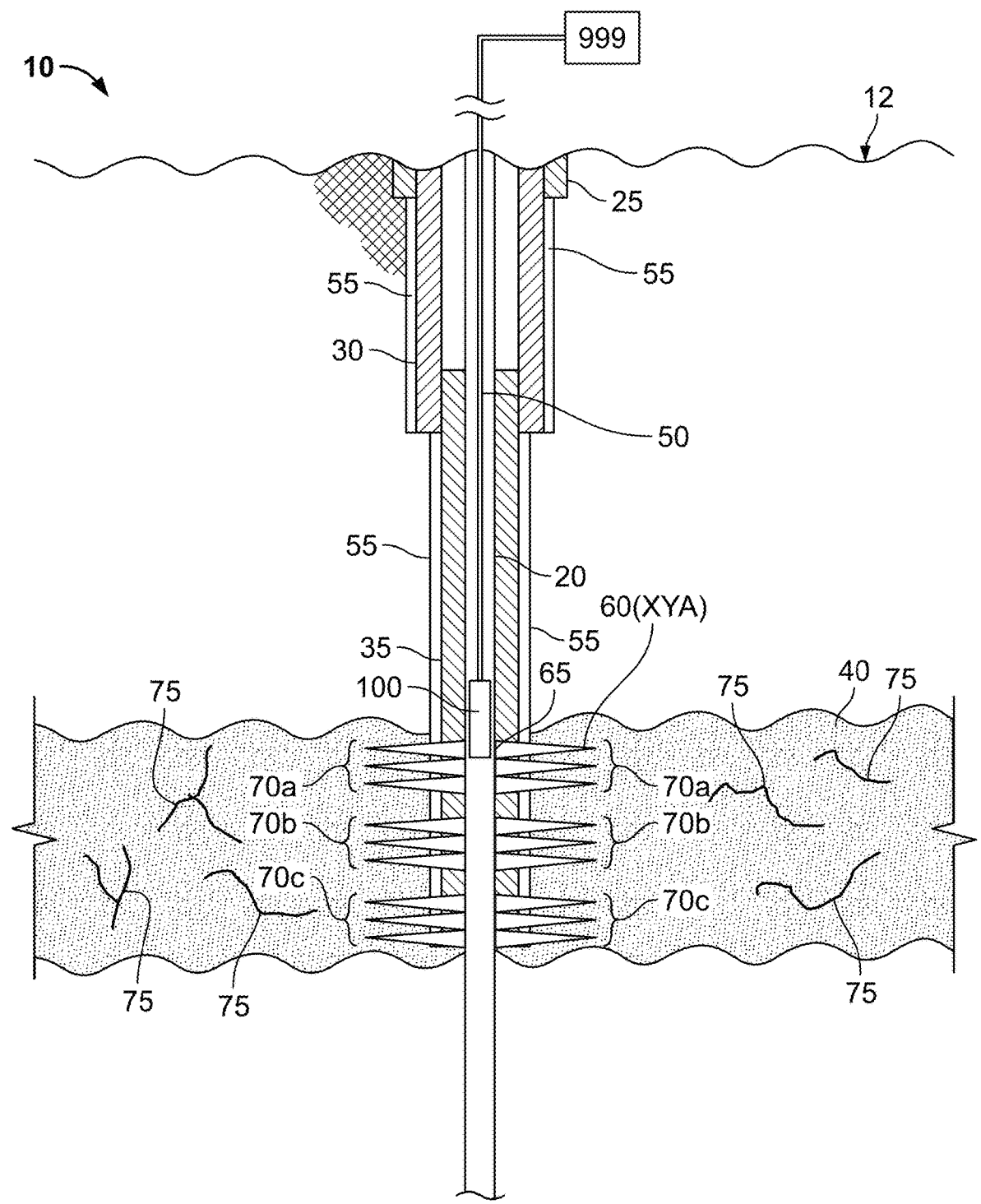
FIG. 1 is a schematic diagram of a hydraulically fractured wellbore from which one or more predicted hydrocarbon production zones can be validated according to the present disclosure.

FIG. 1 a schematic diagram of a wellbore system 10 that includes a hydraulically fractured wellbore 20 from which one or more predicted hydrocarbon production zones can be validated according to the present disclosure. Generally, FIG. 1 illustrates a portion of one embodiment of the wellbore system 10 in which wellbore 20 is formed into a naturally fractured subterranean formation (or reservoir) 40 for the production of one or more hydrocarbon fluids to a terranean surface 12 (through the wellbore 20 and, if used, one or more wellbore tubular strings). Naturally fractured subterranean formation 40 that holds the hydrocarbon fluid(s) can be present beneath several other formation rock layers. The formation 40 can include a primary porous medium of the formation rock. An irregular system of microscopic fractures and small cavities or vugs can be typically present in the primary porous rock medium. Natural fractures 75 in the formation 40 can also be present across a wide range of scale, ranging from microfractures to extensive fractures or faults of thousands of meters. The vertical extent of natural fractures 75 is often controlled by thin layers in the form of shale beds or laminations, or by weak layers of rock in carbonate sequences in the earth.

Natural fractures 75 can be abundant structural features in the formation 40. As described above, natural fractures 75 may be caused by a variety of factors including stress in the formation from tectonic forces, which cause folds and the like. It is typical that a hydrocarbon producing reservoir (such as formation 40) contains some natural fractures 75, but as described the location and extent of such natural fractures 75 is not directly determinable. Natural fractured reservoirs are difficult systems to characterize and difficult to engineer and predict. Natural fractured reservoirs are an important element in reservoir performance, and it is also important to recognize the performance characteristics of a naturally fractured reservoir.

Natural fractures 75 can significantly affect hydrocarbon migration and trap location in the subsurface formations, as well as flow of hydrocarbons to wellbores during production. Knowledge of the presence and extent of natural fractures can significantly improve reservoir development and reduce hydrocarbon production risks. Conventional methods to produce a natural fracture model are based on rock properties (Porosity, density, etc.) and fracture characterization along the wells using in some case the post stack seismic attribute as a drive for natural fracture prediction. The conventional methodologies have been based on assumption taking the fracture description from the wells and extrapolate those into the grid model following a conceptual model.

As shown, the wellbore system 10 accesses a subterranean formation 40 that provides access to hydrocarbons located in such subterranean formation 40. A drilling assembly (not shown) may be used to form the wellbore 20 extending from the terranean surface 12 and through one or more geological formations in the Earth. One or more subterranean formations, such as subterranean formation 40, are located under the terranean surface 12. As will be explained in more detail below, one or more wellbore casings, such as an intermediate casing 30 and production casing 35, may be installed in at least a portion of the wellbore 20. In some embodiments, a drilling assembly used to form the wellbore 20 may be deployed on a body of water rather than the terranean surface 12. For instance, in some embodiments, the terranean surface 12 may be an ocean, gulf, sea, or any other body of water under which hydrocarbon-bearing formations may be found. In short, reference to the terranean surface 12 includes both land and water surfaces and contemplates forming and developing one or more wellbore systems 10 from either or both locations.

In some embodiments of the wellbore system 10, the wellbore 20 may be cased with one or more casings. As illustrated, the wellbore 20 includes a conductor casing 25, which extends from the terranean surface 12 shortly into the Earth. A portion of the wellbore 20 enclosed by the conductor casing 25 may be a large diameter borehole. Additionally, in some embodiments, the wellbore 20 may be offset from vertical (for example, a slant wellbore). Even further, in some embodiments, the wellbore 20 may be a stepped wellbore, such that a portion is drilled vertically downward and then curved to a substantially horizontal wellbore portion. Additional substantially vertical and horizontal wellbore portions may be added according to, for example, the type of terranean surface 12, the depth of one or more target subterranean formations, the depth of one or more productive subterranean formations, or other criteria.

Downhole of the conductor casing 25 can be the intermediate casing 30. The intermediate casing 30 may enclose a slightly smaller borehole and protect the wellbore 20 from intrusion of, for example, freshwater aquifers located near the terranean surface 12. The wellbore 20 may than extend vertically downward. This portion of the wellbore 20 may be enclosed by the production casing 35. Other casings, not specifically shown in this figure, can be included within the wellbore system 10 without departing from the scope of this disclosure. Further, other tubulars (such as liners or otherwise), along with casings, can generally be referred to as "wellbore tubulars" in the present disclosure.

As shown in FIG. 1, a cement layer 55 (or cement 55) is installed in an annulus between each illustrated casing (conductor casing 25, intermediate casing 30, and production casing 35) and the adjacent geologic formation (such as subterranean formation 40). Cement 55 can be circulated downward, during the construction of the wellbore system 10, through one or more casings and back upward into the annulus between the particular casing and the adjacent geologic formation in order to, for example, bond the casing to the formation. Once solidified in the annulus, the cement 55 can provide a barrier to fluid entry into the wellbore 20 as well as maintain the casings in place.

In the schematic of FIG. 1, the wellbore 20 has been hydraulically (or otherwise) fractures to create fractures 60, each of which, for example, extending through a perforation 65 formed in the casing 35. Multiple fractures can be formed simultaneously or sequentially as fracture zones 70a, 70b, and 70c (as well as others). Such fracturing in the formation 40 can be accomplished by any known technique (or any technique developed therefore). Although shown as a cased wellbore, the wellbore 20 (for example, at a depth at which the fracture zones 70a, 70b, and 70c are formed) can be an open hole completion (thereby eliminating, in some aspects, the need for perforations 65 through the casing 35).

In the schematic of FIG. 1, a logging tool 100 is shown run into the wellbore 20 on a downhole conveyance 50 (such as a wireline, slickline, coiled tubing, or other conveyance). The logging tool 100, in this figure, can represent one or more logging tools 100 that are run into the wellbore 20 (sequentially in different trips or along the same conveyance 50 in a single trip) to sense or measure one or more logged parameters of the subterranean formation 40 and/or wellbore 20.

In some aspects and as explained in more detail in this disclosure, the one or more logged parameters can be applied to the concepts of critically stressed fractures and fracture apertures to choose one or more sets of perforation clusters (in other words, fracture zones) in a cased hole completion (such as wellbore 20) or one or more fracturing stage intervals in an open hole completion of the wellbore 20. The one or more logged parameters can be applied in a workflow as a validation technique of a three-dimensional (3D) natural fracture model by providing parameters to physically identify a fluid contribution behind pipe through predicted fractures.

In some aspects, the one or more logged parameters can be high precision temperature (HPT) logging and spectral noise logging (SNL), which can be used in conjunction with a high precision temperature modeling technique. In some aspects, and as shown through fracturing analysis, that spectral noise logging data have a high degree of correlation with a formation image log used for an identification of different types of fractures, faults, and textural features). However, a formation image log tool can only give an idea of the reservoir structure at the time a well is put on production while new fractures can frequently develop when the well is put on production or some of the fractures identified in the open-hole section stay inactive. Thus, the present disclosure and workflow include critical stress fracture modeling that improves the static formation image log data in combination with an integration of the logged parameters (HPT and/or SNL) to analyze a fluid flow behind a casing in the formation. In some aspects of the present disclosure, active fracture flow zones can be distinctly outlined by the one or more logged parameters to validate the presence of critical fractures.

As shown in FIG. 1, a logging control system (or control system) 999 can be communicably coupled (wired or wirelessly) to the logging tool 100 to receive and process the logged one or more parameters of the wellbore 20 and/or the formation 40. In some aspects, the logging control system 999 can receive or download the measured or sensed logging parameters subsequent to one or more logging operations performed with the logging tool 100. In some aspects, the logging control system 999 can receive the measured or sensed logging parameters during one or more logging operations performed with the logging tool 100 (for example, in real time as the logging tool 100 is measuring or sensing logged parameters, such as HPT and/or SNL). In some aspects, the logging control system 999 comprises a micro-processor based computing (or distributed) computing system.

Figure 2:
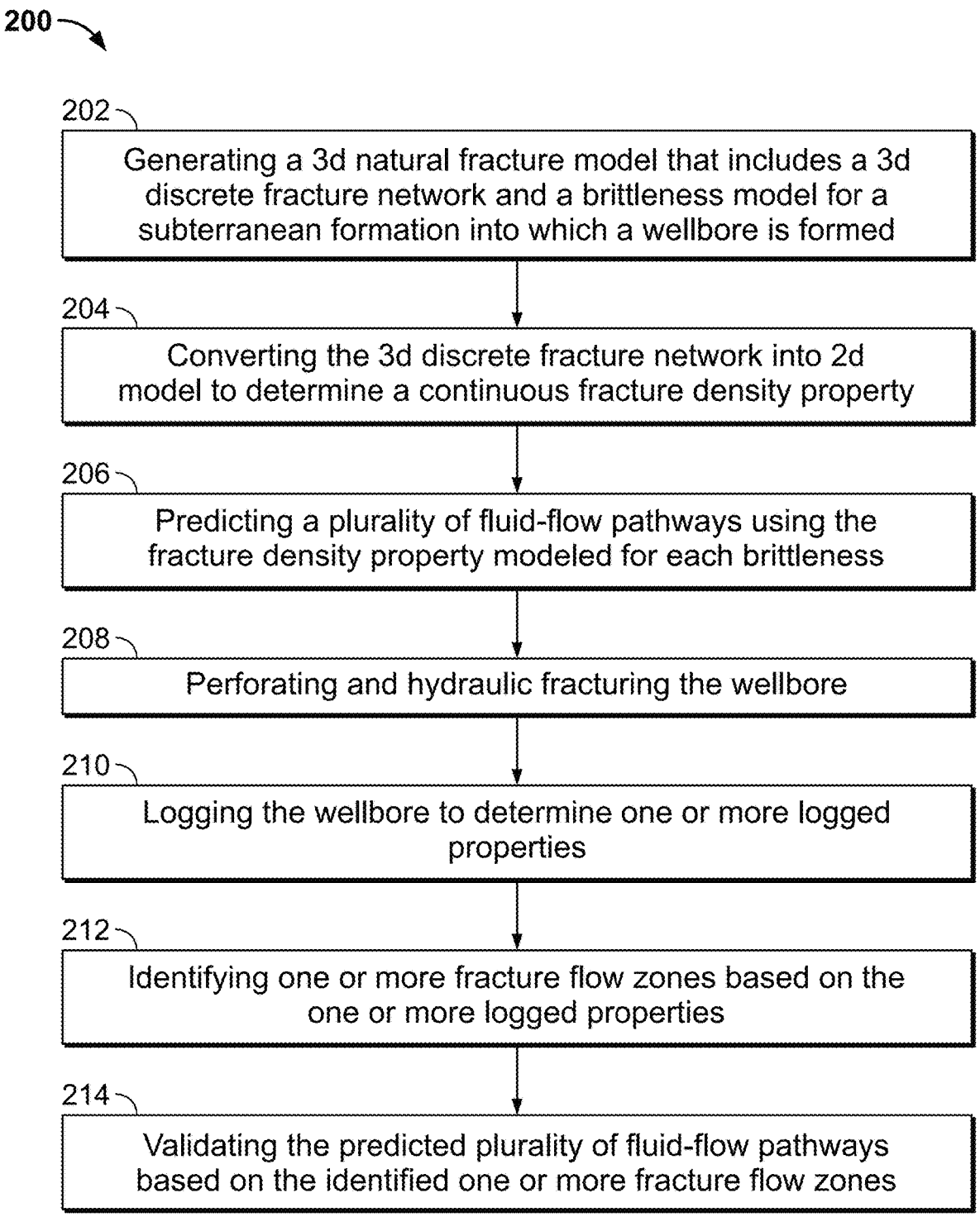
FIG. 2 is an example method for determining and validating one or more predicted hydrocarbon production zones of a subterranean formation according to the present disclosure.

FIG. 2 is an example method 200 for determining and validating one or more predicted hydrocarbon production zones of a subterranean formation. In some aspects, one or more steps of method 200 can be performed with or by the control system 999 of FIG. 1 (with wellbore system 10). Method 200 can begin at step 202, which includes generating a 3D natural fracture model that includes a 3D discrete fracture network and a brittleness model for a subterranean formation into which a wellbore is formed. In some aspects, step 202 can be performed in accordance with the disclosure of U.S. Pat. No. 10,607,043, which is incorporated in its entirety herein by reference. For example, reservoir parameters and properties from a plurality of disciplines of earth science regarding formation 40 are obtained, assembled and stored in logging control system 999. The reservoir parameters can include seismic attributes from seismic surveys; rock and mechanical properties from geological modeling of the formation 40; measures from structural restoration models; rock geological characterizations obtained from formation core samples (of formation 40) and well logs performed in the wellbore 20; and reservoir engineering measures obtained from production measures and reservoir simulations of the subterranean formation 40.

The assembled reservoir parameters are subjected to fracture modeling. One of the main components for natural fractures prediction under step 202 is the geomechanical model, wherein an in situ stress regime and the paleo-stress deformation accumulated by different geological time have been included into the method 200. In the context of the present invention, the in situ stress regime is a condition where the stress field is unperturbed or is in equilibrium without any production or influences of perforated wells.

Figure 3A:
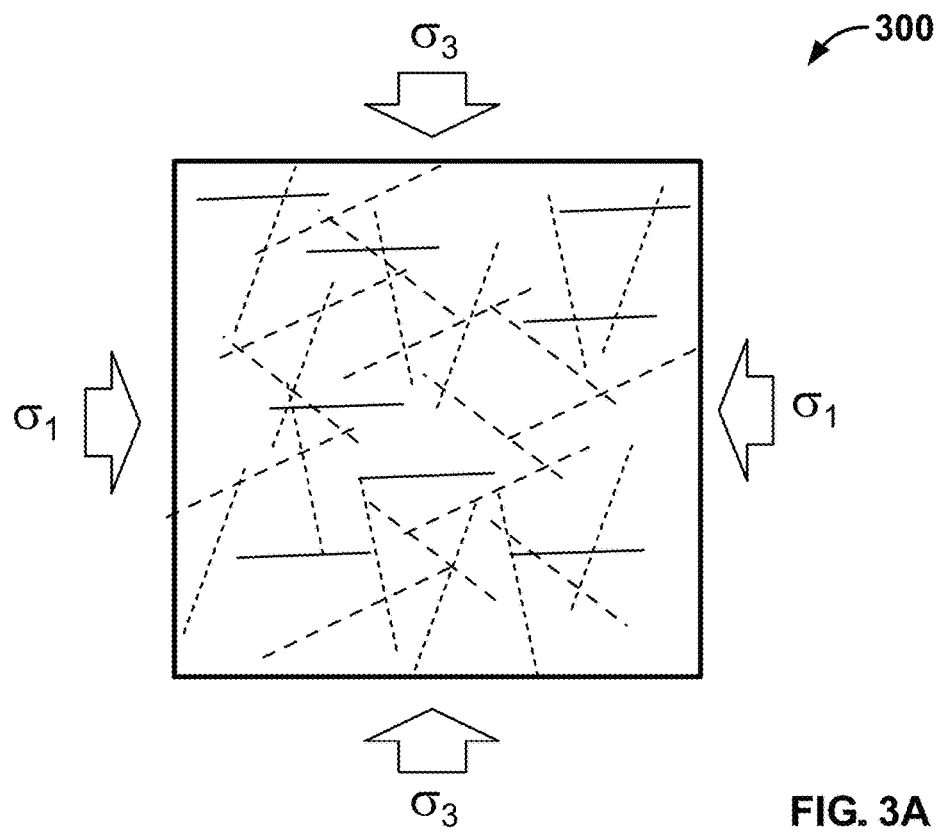
FIGS. 3A-3B are a diagram and graph, respectively, that describe a stress state on a discrete portion of a subterranean formation according to the present disclosure.
Figure 3B:
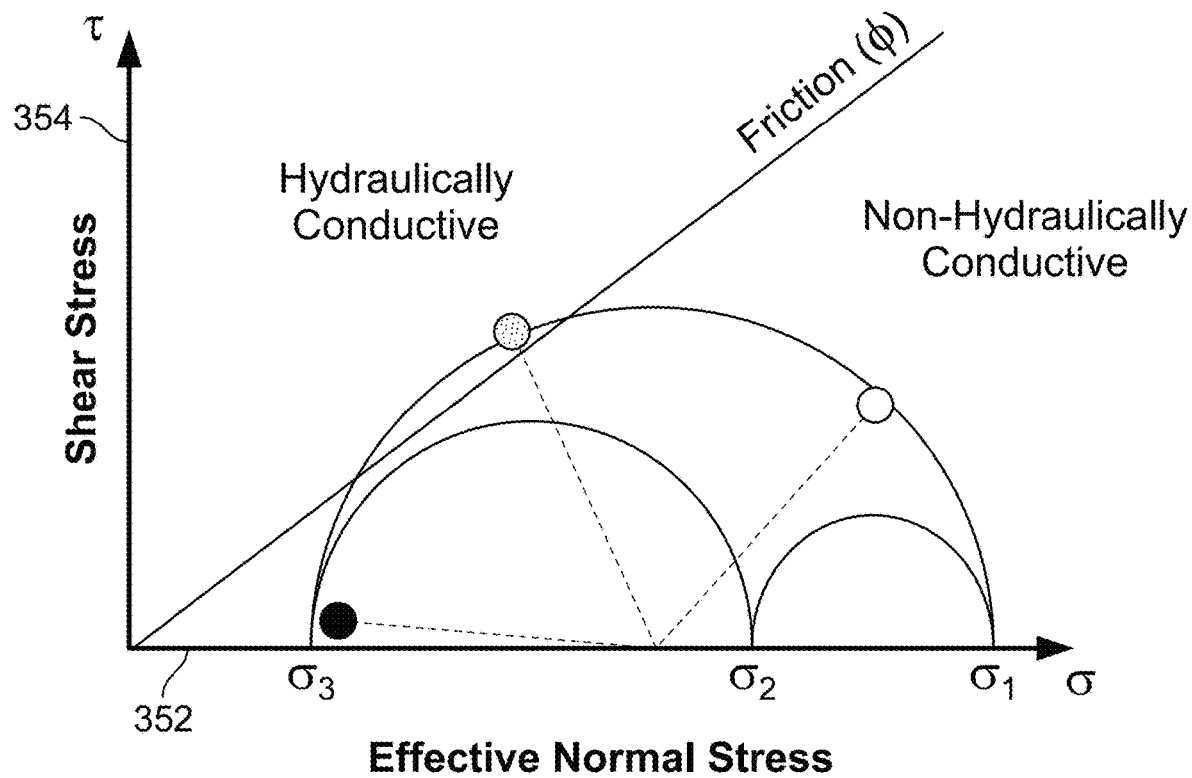

Turning to FIG. 3A, this figure shows a schematic 300 of a critically stressed formation as formation 40. Schematic 300 shows how stresses ($\sigma_1$ through $\sigma_3$) on a discrete portion of the formation 40. FIG. 3B shows a graph 350 with x-axis of effective normal stress ($\sigma$) and shear stress (T) act on the discrete portion of the formation 40. Generally, permeability in the formation 40 is equal or substantially equal to the permeability from normal closure plus the permeability from shear dilatation.

In some aspects, the main fluid flow pathways of hydrocarbon fluid flow in a reservoir are discriminated from a 3D Discrete Fracture Network (DFN) resulting from a geomechanics and natural fracture prediction (NFP) modeling workflow. The present disclosure applies the concepts of critically stressed fractures and fracture apertures estimation described in U.S. Pat. No. 10,607,043. From the different fracture sets existing within the reservoir, only certain fractures may be optimally oriented under "in situ stress" for shearing reactivation, and therefore, hydraulically more conductive. Fracture aperture computed using a micro-resistivity method confirms that fractures closer to failure by shear stress exhibit larger apertures and therefore, they are expected to have higher permeability. The result of this analysis is a discretized 3D Fracture Network, containing only fractures representing main fluid pathways in the reservoir. FIGS. 3A-3B illustrate the concept of critically stressed fractures.

The natural fracture system of formation 40 is closely related with the current and past deformation due the stress variation through the geological time. Different types of fractures can be created during those episodes. For instance, step 202 can include two phases or stages. A first processing stage takes the form of a geomechanics fracture controller, while a second processing stage produces a predicted natural fracture model.

The geomechanics fracture controller involves integration between a paleo-stress from a structural restoration model obtained for several stages in geological time, and current stress regime conditions obtained through geomechanical numerical simulation model. This step involves seismic volume interpretation techniques and attributes that can be applied to detect possible faults and natural fractures alignments by using post stack discontinuities attributes, azimuthal analysis and elastic seismic inversion.

The natural fracture model prediction processing stage is performed to quantify fracture density in the subterranean formation 40 using the geomechanics fracture controller results, and fracture characterization provided from core samples and borehole well log images from a borehole image (BHI) analysis process. This sub-step can also determine fracture dimensions and their properties into the discrete fracture model, as will be described. Examples of the fracture properties include fracture position, orientation, geometry, porosity, aperture, permeability, and the like.

In the fracture modeling validation or confirmation processing step, the fracture model is cross-checked or validated using reservoir production data. If necessary, the natural fracture model may need to be upscaled to conform to a fine-scale cell grid of geological model and reproduce the natural fracture distribution and their properties, for comparison with the reservoir production data for validation proposes. Several types of reservoir production data can be used to calibrate the fracture model with reservoir engineering data. Example of such reservoir production data are results of measures obtained from: PTA (Pressure Transient Analysis), tracers, drilling operation events, PLT (production logs), and the like.

Considering the natural fracture model prediction processing stage, a seismic fracture detection process is provided with seismic attributes obtained from seismic volume results. The seismic attributes provided are attributes related to natural fractures detections or dislocation detections. Examples of such attributes obtained from the seismic dislocations attribute analysis results are: variance, anti-tracking, flatness, curvature, and the like. It should be understood that other seismic attributes might also be provided. Seismic fracture attributes cannot be compared straight forward at wellbore scale due to resolutions issues. However, seismic attributes can be used as a seismic fracture controller or conduct for minor fractures detected at wellbore scale, if the relations regarding to the locations and intensity between them exist.

Advance seismic fracture detection may also be performed, if desired, during the seismic fracture detection process using azimuthal seismic analysis, in order to capture the variations of the wave propagation at different directions. Such variations in wave propagation form anisotropic volumes in the subterranean formation 40 and are helpful in detecting fractures. This azimuthal analysis requires knowledge regarding whether the anisotropy response in the formation 40 is due to natural fractures or caused by another reason. In order to identify whether the anisotropy response maybe azimuthal shear anisotropy, sonic acoustic acquisition can be perform at the well location. An example of azimuthal seismic analysis is described in: Gray, F. D. and Head, K. J., 2000, Fracture Detection in the Manderson Field: A 3D AVAZ Case History: The Leading Edge, Vol. 19, No. 11, 1214-1221; and Khalid Al-Hawas, Mohammed Ameen, Mohammad Wahab, and Ed Nebrija, Saudi Aramco, Dhahran, Saudi Arabia Colin Macbeth, Heriot-Watt University, Edinburgh, U. K., 2003, "Delineation of Fracture Anisotropy Signatures in Wudayhi Field by azimuthal seismic data, the Leading Edge."

A 1D mechanical earth model (MEM) of the geomechanics fracture controller determines the rock mechanical properties and stress regime conditions in the subterranean formation 40. The 1D MEM process starts with computing the elastic rock mechanical properties deriving from well logs and rock mechanical tests; and using additional information as reservoir formation pressures and a Formation Integrity Test (FIT), the in situ stress regime can be predicted and mechanical stratigraphy (Geomechanical Facies) computed. Thus, mechanical stratigraphy conforms the rock mechanical response to the geological deformation process and can be used as constraints for natural fractures presence, constraining their development to some particular layer through brittleness concepts, depending also of the deformation magnitude. Additionally, the maximum horizontal stress direction which can be detected by a Borehole Image Analysis (BHI), and the in situ stress magnitude derived from 1D MEM process are used to predict the stress regime.

A 2D/3D geomechanics forward model process of the natural fracture model prediction processing stage combines a structural model and displacement, paleo-stress and strain measures from the structural restoration model with petrophysical properties from a geological model. The results take the form of structural restoration as horizons displacement and deformation using boundary conditions. The 2D/3D geomechanics forward model process is performed as a Finite Element Method (FEM) using geomechanics numerical simulation software, to estimate the tensor stress regime corresponding to the deformation estimate from structural restoration at the in situ stress conditions.

As part of step 202 and in generating the 3D natural fracture model, a rock brittleness index can be developed. For example, a rock brittleness property can be differentiated when subjected to stress; it breaks without significant plastic deformation. Brittle materials absorb relatively little energy prior to fracture, even those of high strength. In a complex heterogeneous fracture rock mass (such as formation 40), the brittleness property can be modeled using neuronal network classification taking as inputs the elastic properties and stress regime producing mechanical facies. Those mechanical facies can have some proportional relation with the distribution of natural fractures.

Figure 4:
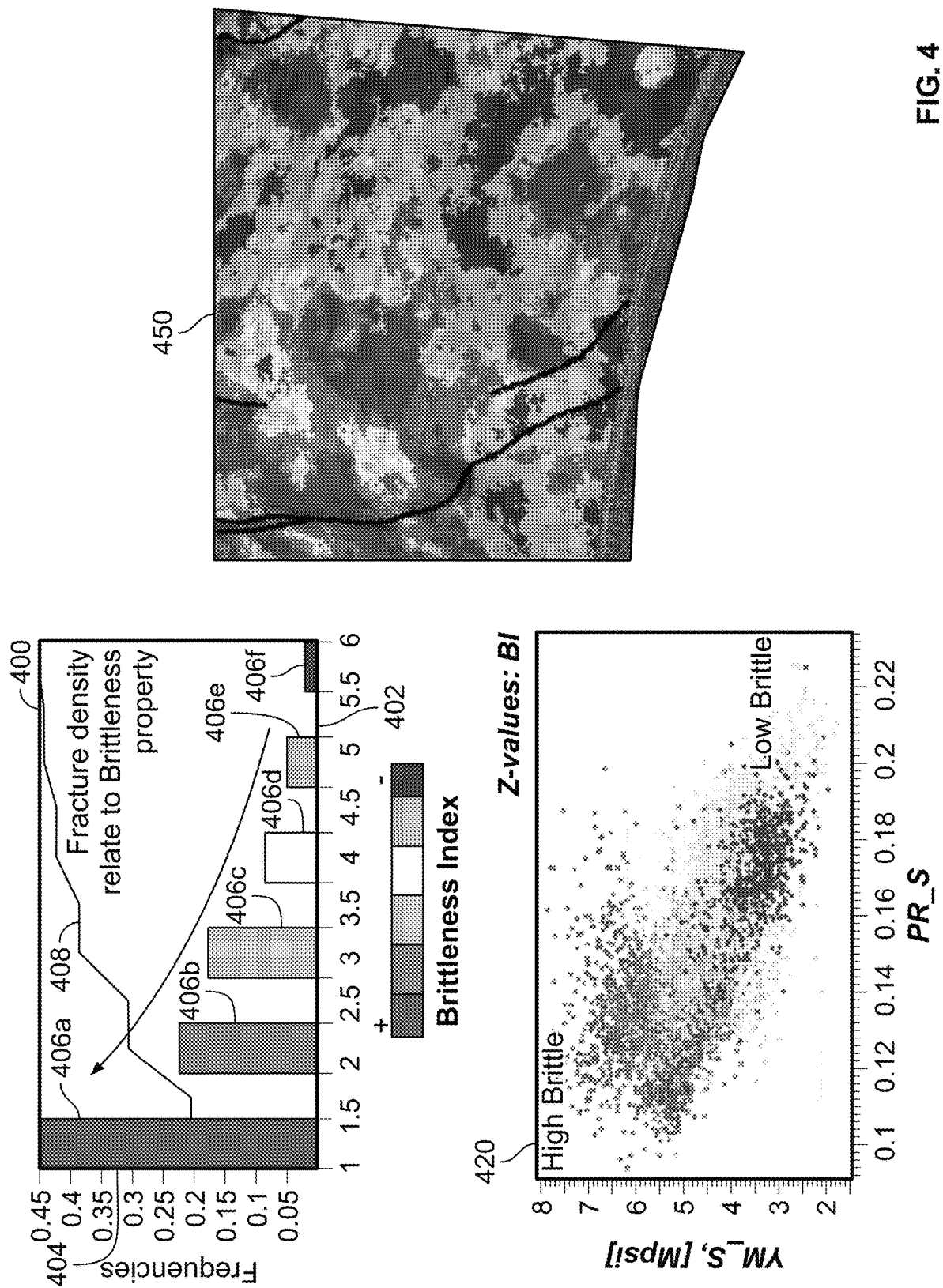
FIG. 4 shows several graphical representations of a brittleness property of a discrete portion of a subterranean formation according to the present disclosure.

This correlation can be evaluated using a histogram filtered by density fracture. For example, FIG. 4 shows several graphical representations of a brittleness property of a discrete portion of a subterranean formation, such as subterranean formation 40. The graphical representations 400, 420, and 450 show a 3D brittleness model related to the density of natural fractures 75 in the subterranean formation 40. For example, graph 400 includes a histogram of numerical values 406a-406f that represent numerical values (measured on the y-axis 404) for each discrete brittleness value (measured on x-axis 402). As shown, there is a higher number (406a) of more brittle portions of the formation 40 than least brittle portions (406f). Fracture density 408 is inversely proportional to brittleness. Graph 420 is plot of Young's Modulus (YM) and Poisson Ratio (PR); the mechanical properties of the rock. As seen in the graph a rock with low PR value and high YM value is highly brittle while on the right end of the plot with high PR value and low YM the rock tends to be more ductile. This correlation from graph 420 is extended to the entire field in graph 450 and the propensity of fracture density is related to the brittleness of the rock.

Figure 5A:
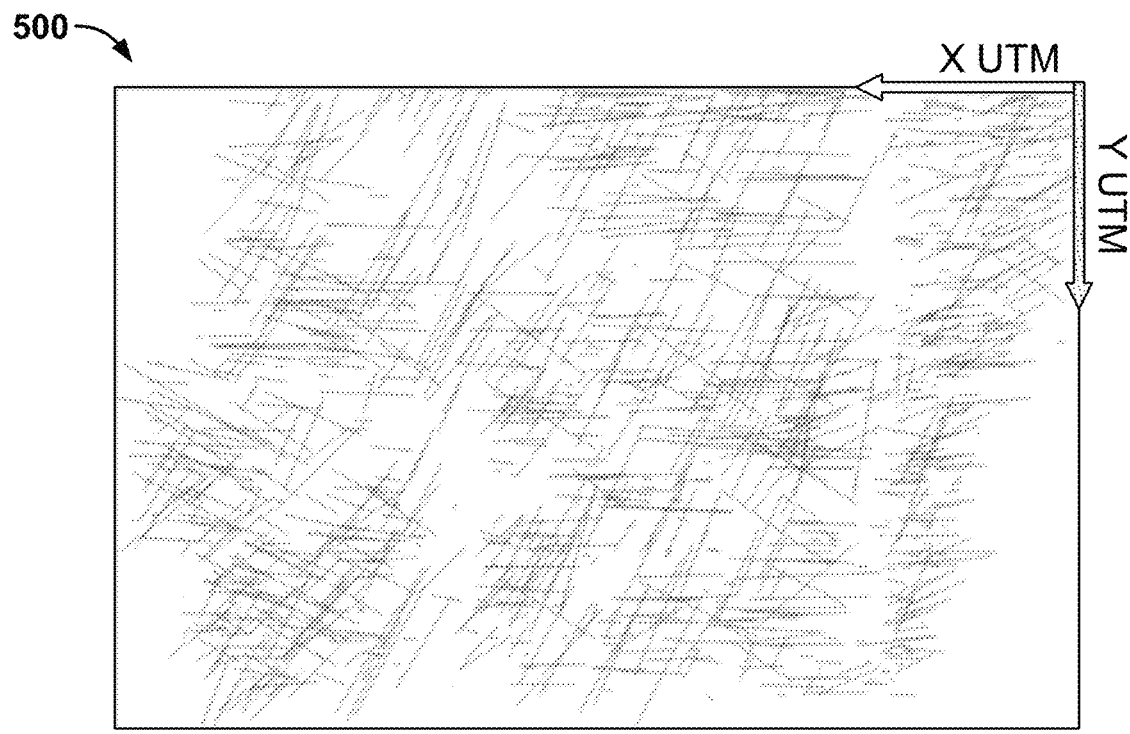
FIGS. 5A-5B show graphical representations of a 2D fracture network as input for the line density computation according to the present disclosure.
Figure 5B:
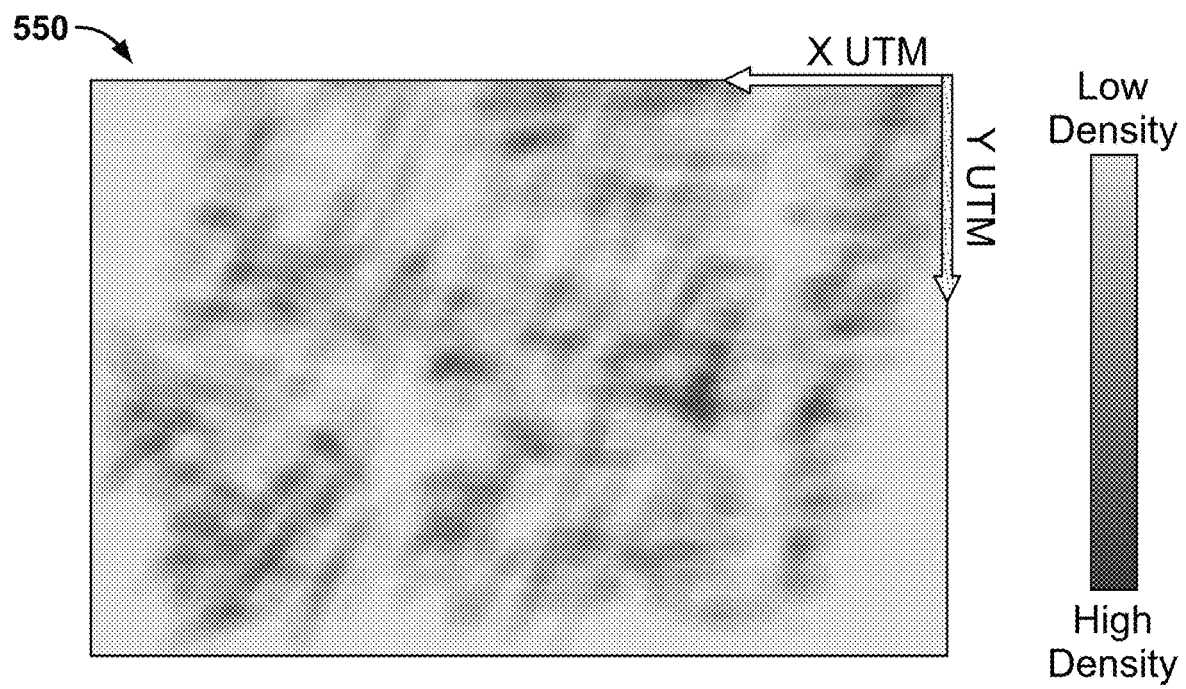

Method 200 can continue at step 204, which includes converting the 3D discrete fracture network into a 2D model to determine a continuous fracture density property. For instance, the 3D discrete fracture network representing critically stressed fluid pathways resulting from step 202 can be converted into 2D lines to compute a continuous fracture density property by, for example, an available GIS geo-processing software (commercial and open) with tools to compute line density (for example, Esri-ArcGIS™) to generate a raster map representing fracture density per area. A suitable color-indexed palette can be assigned in order to visually spot areas where natural fractures are more concentrated. FIGS. 5A-5B show a 2D fracture network as input for the line density computation. For instance, FIG. 5A shows graphical representation 500 of a 2D fracture network that represents the main fluid pathways. FIG. 5B shows graphical representation 550 of a computed line density raster using the 2D fracture network as input.

Figure 6:
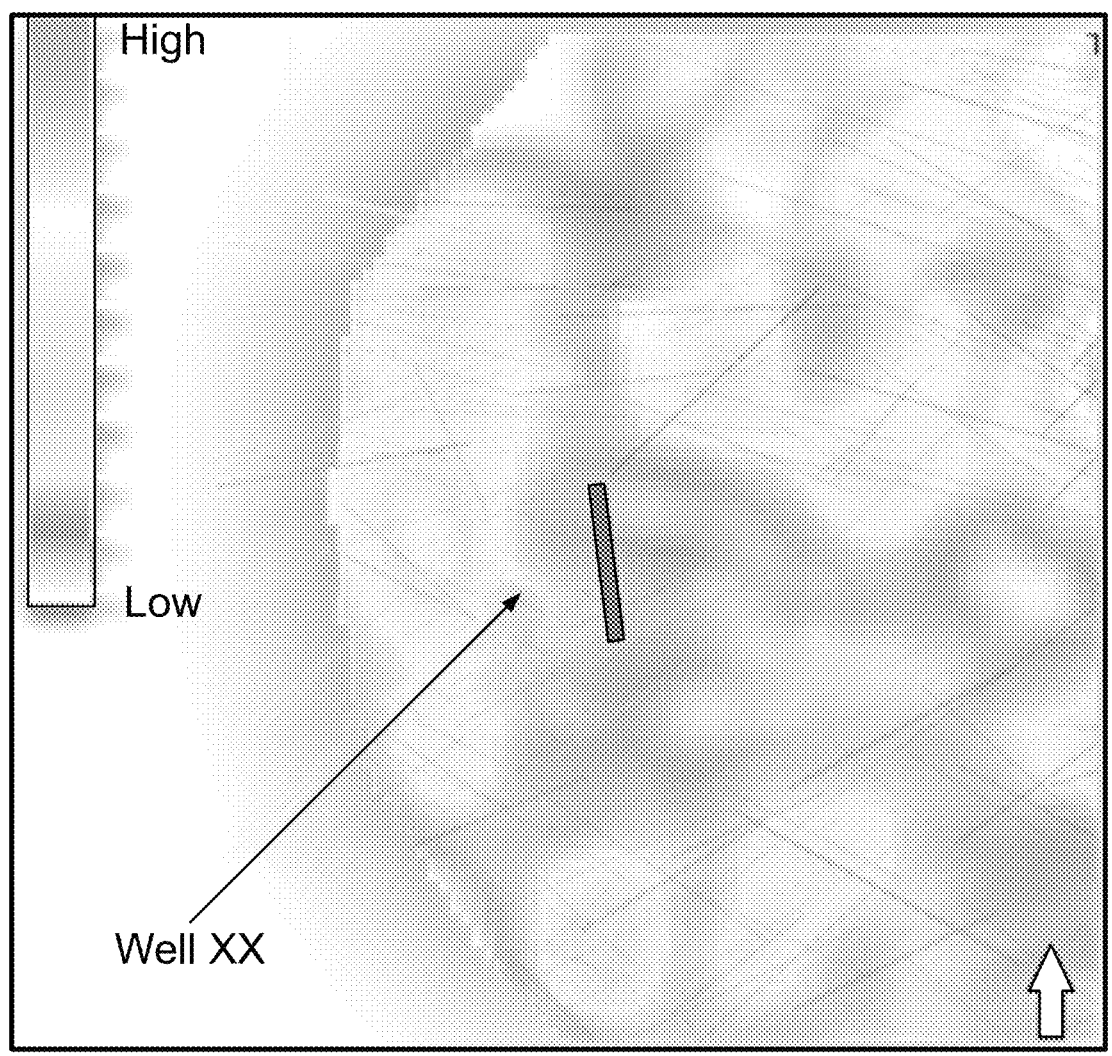
FIG. 6 shows a graphical representation of a gray-scale normalization of the fracture density index (FDI) according to the present disclosure.

FIG. 6 shows a gray-scale normalization of the fracture density index (FDI). More specifically, graphical representation 600 is a gray scale normalized image from the 2D raster map to represent a relative variability of the fluid-flow paths concentration. The highly concentrated areas of flow-paths with darker gray and the lowest concentrated areas of flow paths with white color.

Figure 7:
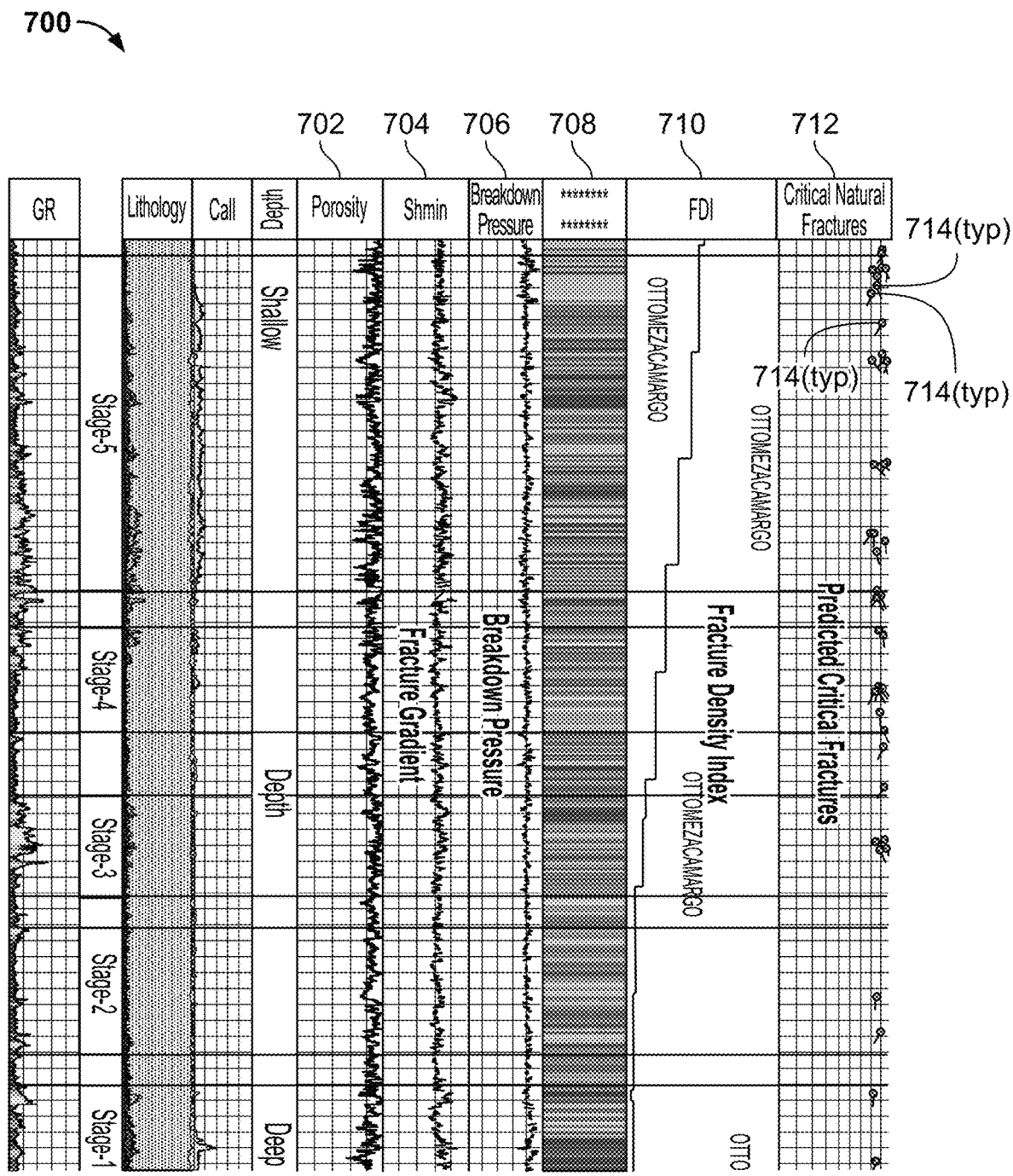
FIG. 7 shows a composite log that contains a brittleness model, a fracture density index, and tadpoles that represent fluid flow paths for a wellbore according to the present disclosure.

Method 200 can continue at step 206, which includes predicting a plurality of fluid-flow pathways using the fracture density property modeled for each brittleness. For example, fluid-flow paths for the natural fractures can be predicted using the equivalent fracture density modeled for each brittleness index class (of FIG. 5) defined on the histogram as shown in graph 400, combined with the response on Fracture Density Index normalized (shown in FIG. 6). As a result, FIG. 7 shows a composite log 700 that contains the brittleness model, fracture density index, and tadpoles that represent the fluid flow paths for the wellbore 20.

More specifically, composite log 700 includes tracks (by depth) of porosity 702, fracture gradient 704, breakdown pressure 706, brittleness 708, FDI 710, and predicted natural fractures 712, which includes the tadpoles 714. The tadpoles 714 represent selections (for example, by the logging control system 999 or an operator) of depths or locations on the wellbore 20 of the predicted critical natural fractures that are the hydrocarbon flow paths in the subterranean formation 40.

Method 200 can continue at step 208, which includes perforating (optional and if necessary) and hydraulic fracturing the wellbore (which, in turn, creates hydraulic fractures in the subterranean formation). For example, steps 202-206 can be performed prior to completion (for example, perforating, if necessary, and fracturing) the wellbore 20 (as a vertical or horizontal wellbore). In some aspects, wellbore 20 is a new wellbore (for example, recently drilled). Alternatively, the wellbore 20 can be an existing wellbore that is recompleted. In any event, as shown in FIG. 1, the wellbore 20 can be (in this example) perforated and fractured to create hydraulic fractures 60 in fracture zones 70a-70c. In some aspects, following a hydraulic fracturing treatment, the evaluation of created hydraulic fractures are conventionally performed by radioactive tracers, temperature and production logs and supported by pressure transient testing. While temperature and tracer logs can provide reasonable estimation of minimum vertical fracture growth and the tracer log an extent of proppant propagation in vertical wells their main drawbacks are their shallow depth of investigation and are limited to near wellbore area only. Production logs can be helpful in identifying fluid entry points within the wellbore but very little beyond that.

Method 200 can continue at step 210, which includes logging the wellbore to determine one or more logged properties. For example, as shown, the logging tool 100 (or multiple logging tools) can be run into the fractured wellbore 20 and measure or sense one or more logged properties. In some aspects, step 210 includes a combination of Spectral Noise Logging (SNL) and High Precision Temperature (HTP) logging. For example, temperature logging can be an efficient technique to locate inflow intervals in the reservoir, evaluate inflow rates in them and the drawdown pressure that creates temperature disturbance, detects cross-flows in the wellbore and/or behind casing and checks for casing, tubing and bottom-hole leakages. Temperature logging can detect wellbore flows with rates much below a mechanical spinner's threshold. Another application of temperature logging is picking flow zones behind unperforated casing that develop through behind-casing channeling. Such findings can be verified or discarded through numerical simulation of temperature logs.

Regarding SNL, fluid movement generates acoustic noise and the intensity (amplitude) of the noise is proportional to the differential pressure. The noise spectrum on the other hand depends on the medium in which the fluid moves. Larger pores generate low frequency noise whereas small pores produce high frequency noise. However, the boundaries of the frequency spectrum are not well defined and there are overlaps. Nonetheless, a High Definition Spectral Noise Tool (SNL-HD) (implemented in logging tool 100) can provide reasonable information about the nature of the noise origin. It is based on the analysis of data acquired by a broadband high-definition spectral acoustic logging tool. The acoustic signal component produced by fluid flow through the rock matrix can be distinguished from other acoustic signals caused, for example, by wellbore or channel flows by its frequency features. The layer formation pressure is determined by numeric simulation using an empirical correlation between the reservoir fluid flow velocity, pressure gradient, and the reservoir-related component of acoustic power.

In some aspects, step 210 can include both HPT logging and SNL. For example, fluids moving through the reservoir to the well system have thermal mass and can heat or cool the areas they touch. These temperature changes carry information about fluid behavior, particularly flow rates and profiles. However, the physical laws of thermo-hydrodynamics are complex, and the interactions between them even more so. Numerical temperature simulations are therefore used to model the wellbore, multilayer reservoir and surrounding rocks as well as fluid flows in multilayer reservoir system and a wellbore with respect to cross-flows and channeling between the units. It is coupled by the thermodynamic effects that occur while fluid flows through the formation 40 and wellbore 20. The comparison of computed model results with HPT logging data enhances the interpretation of temperature data and quantifies wellbore and reservoir performance. Combining both HPT logging and SNL with array production logging provides a complete evaluation of borehole and behind liner flow and allows for better optimization of reservoir production in such challenging environment. Modeling can show that, along with wellbore flow and reservoir pressure verification, HPT logging is capable to distinguish the active reservoir zones behind perforations, which cannot be reliably captured by spinners.

Figure 8:
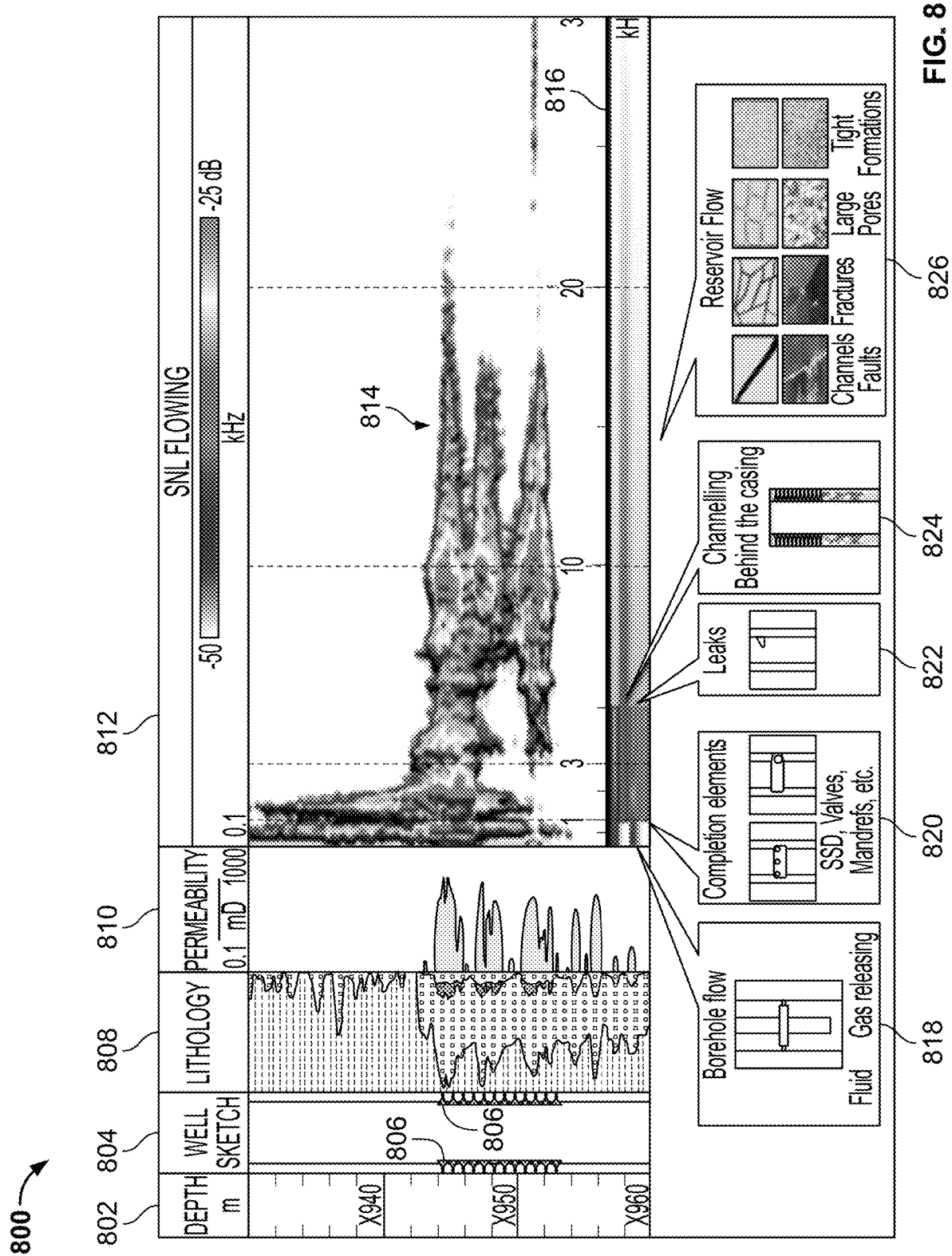
FIG. 8 shows a graphical representation of an ideal frequency spectrum that is measured by a high definition spectral noise logging due to fluid flow in various downhole mediums according to the present disclosure.

FIG. 8 shows a graphical representation 800 of an ideal frequency spectrum that is measured by a high definition spectral noise logging due to fluid flow in various downhole mediums. For example, graphical representation 800 displays the noise data in three dimensions: Depth, Frequency and Amplitude. Graphical representation 800 includes panels of depth 802, a well sketch 804 with well fractures 806, lithology 808, permeability 810, and the high definition spectral noise 814 measured of the flowing fluid in panel 812. As shown, the noise 814 is measured in kilohertz 816 and in gray scale to further illustrate which noise frequency can be associated with particular flow regimes. For example, panel 818 shows a gray scale color associated with borehole flow. Panel 820 shows a gray scale color associated with flow through completion elements (for example, valves, mandrels etc.). Panel 822 shows a gray scale color associated with flow through leaks in casing or other tubulars. Panel 824 shows a gray scale color associated with flow associated with channeling behind casing. Panel 826 shows a gray scale color associated with flow within the subterranean formation 40, such as flow within channels, natural fractures, pores, and tight formations.

Figure 9:
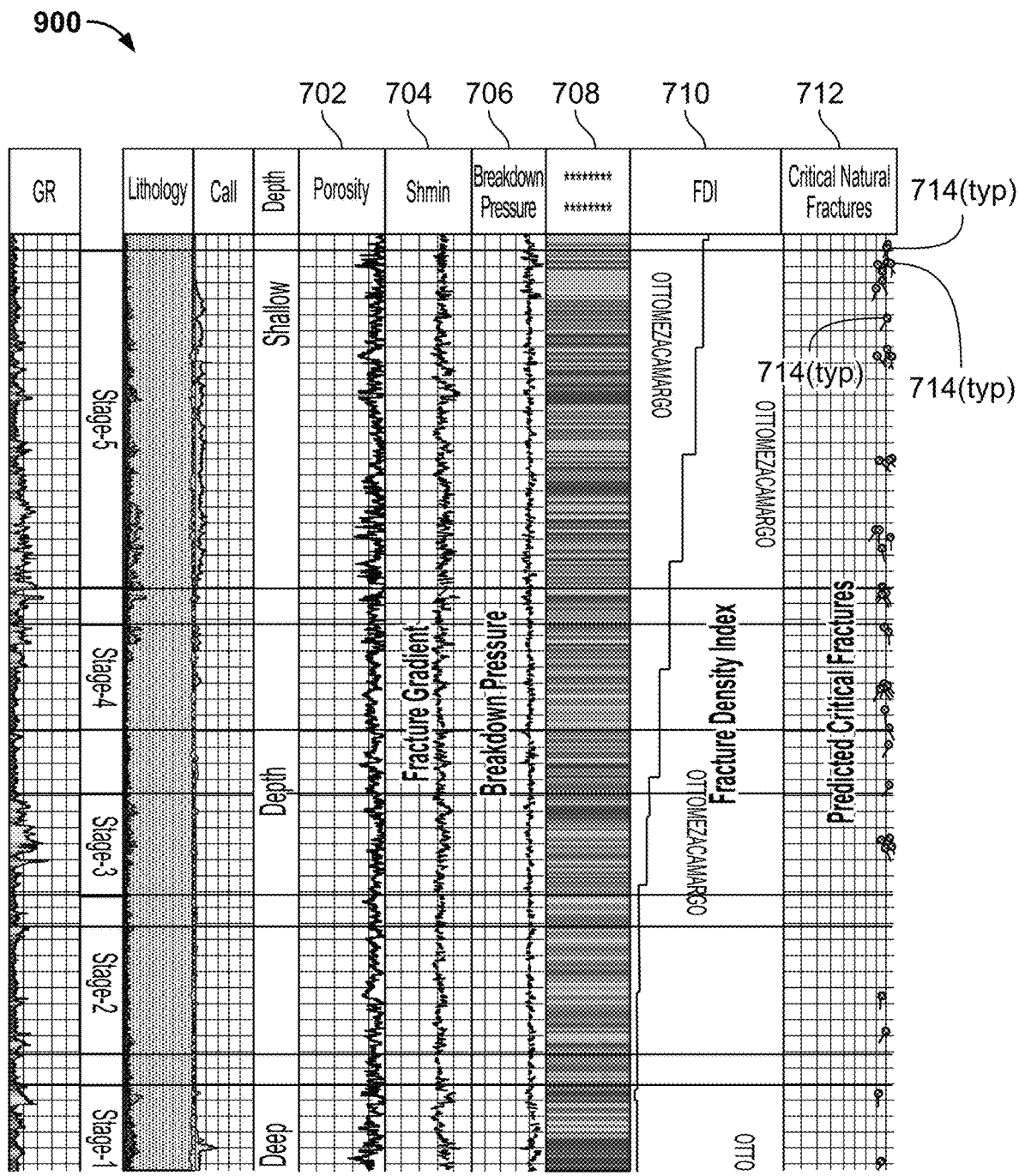
FIG. 9 shows a composite log that contains a brittleness model, a fracture density index, tadpoles that represent fluid flow paths for a wellbore, and logging data according to the present disclosure.
Figure 9:
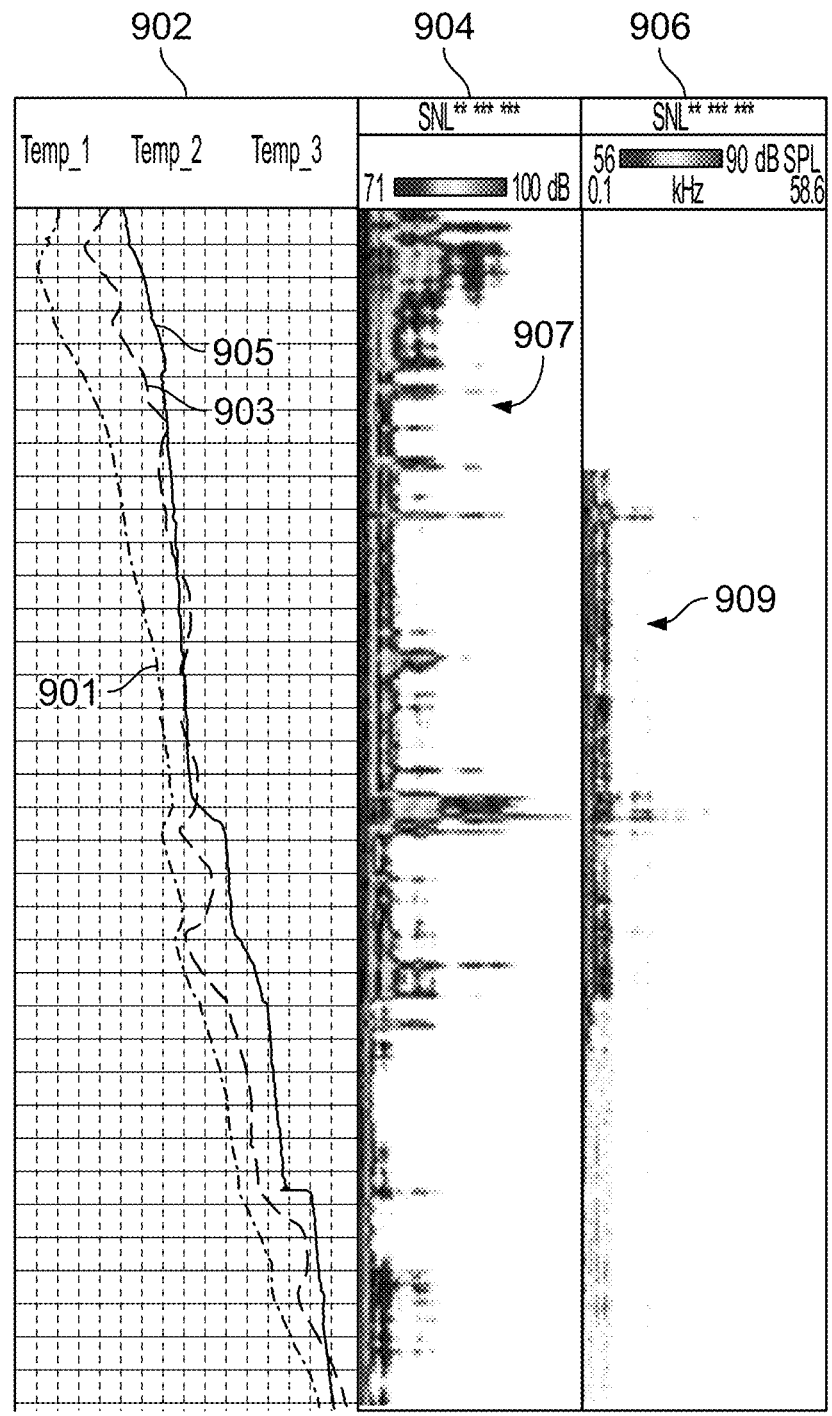

Method 200 can continue at step 212, which includes identifying one or more fracture flow zones based on the one or more logged properties. For example, once the wellbore 20 is logged by the logging tool 100 (one or many trips), such as for HPT and SNL, these logs can be added to the composite log 700 to form a composite log 900 shown in FIG. 9. Composite log 900, as shown in this example, includes tracks (by depth) of porosity 702, fracture gradient 704, breakdown pressure 706, brittleness 708, FDI 710, and predicted natural fractures 712 with the tadpoles 714, a HPT log 902, an SNL 904 under flowing conditions, and an SNL 906 under shut-in conditions. As shown, the HPT log 902 includes three tracks 901, 903, and 905. Tracks 901, 903, and 905 represent three different temperature tracks taken during HPT logging runs in the wellbore 20. Together, the HPT log 902 and SNL 904 can be used to identify the flow contributing zones (or the absence of contributing zones) behind the casing 35 (or other casings) in the wellbore 20.

Method 200 can include step 214, which includes validating the predicted plurality of fluid-flow pathways based on the identified one or more fracture flow zones. For example, in some aspects, the logging control system 999 (and/or on operator) can identify fracture flow zones (from the HPT log 902 and SNL 904) that align (at particular depths) with, for example, tadpoles 714 that represent selections (for example, by the logging control system 999 or an operator) of depths or locations on the wellbore 20 of the predicted critical natural fractures that are the hydrocarbon flow paths in the subterranean formation 40. This validating step, in some aspects, can include the logging control system 999 determining particular depths of temperature and/or spectral noise (from the HPT log 902 and/or SNL 904) that correspond to fluid flow and that also match depths at which one or more tadpoles 714 have been located. Step 214 can also include comparing the well performance of wellbore 20 (in other words, the identified flow contributing zones at particular depths) to with offset wells (other wells besides wellbore 20 drilled into subterranean formation 40) to help determine lower breakdown pressures and higher well productivity. In some aspects, should the logging information not completely validate the fracture flow zones, such logging information can calibrate the predicted plurality of the fluid-flow pathways and the 3D fracture model.

One or more steps of method 200 can be performed with or by the logging control system 999. For example, steps 202-206 can be performed by or with the logging control system 999. Logging operations, such as in step 210, can be performed with or by the logging control system 999. In some aspects, steps 206, 212, and 214 can be performed by an operator with the logging control system 999 (or solely by the logging control system 999).

Figure 10:
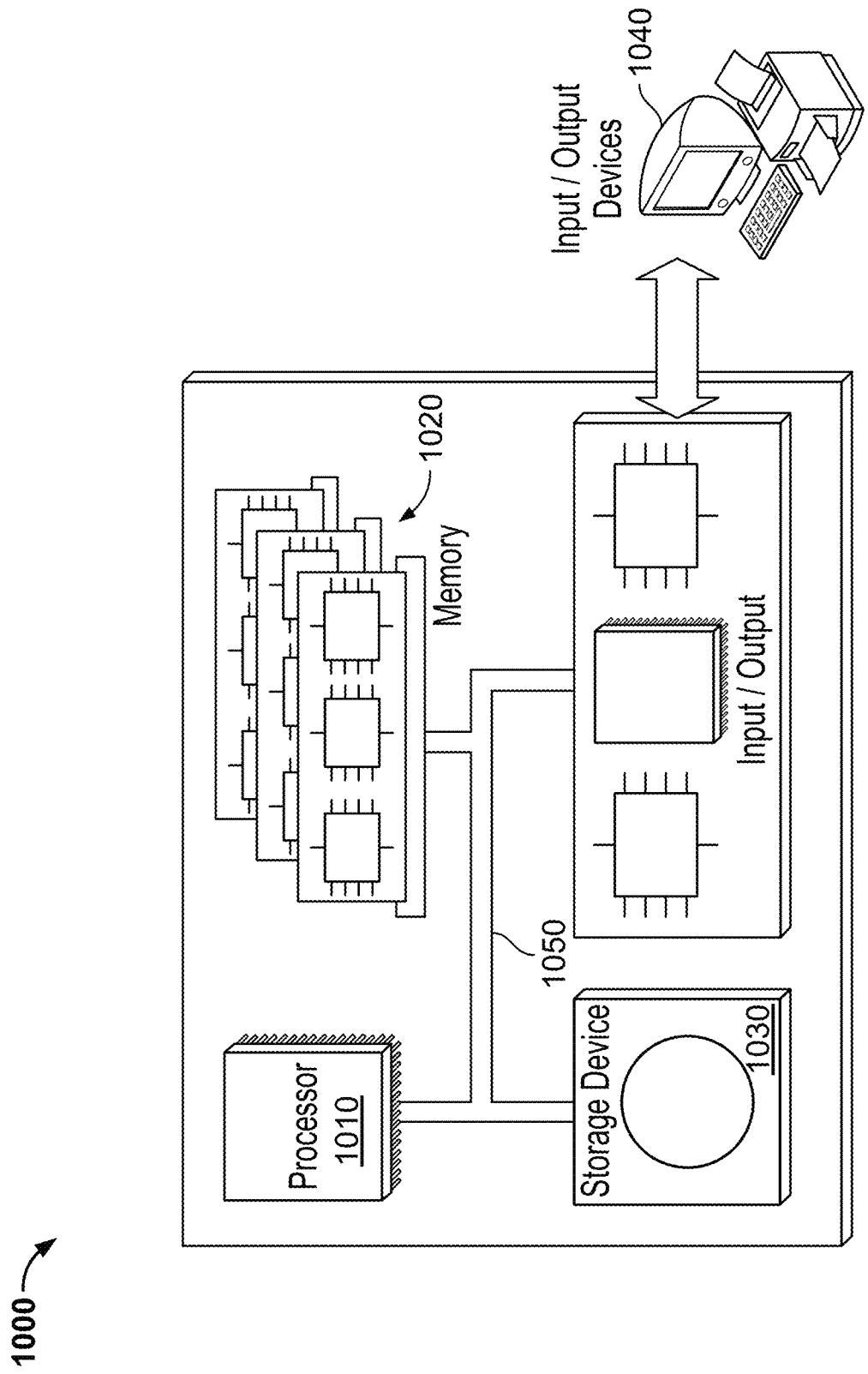
FIG. 10 is a schematic diagram of an example control system according to the present disclosure.

FIG. 10 is a schematic diagram of a control system 1000. The control system 1000 can be used for the operations described in association with any of the computer-implemented methods described previously. The system 1000 is intended to include various forms of digital computers, such as laptops, desktops, workstations, personal digital assistants, servers, blade servers, mainframes, and other appropriate computers. The system 1000 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. The processor may be designed using any of a number of architectures. For example, the processor 1010 may be a CISC (Complex Instruction Set Computers) processor, a RISC (Reduced Instruction Set Computer) processor, or a MISC (Minimal Instruction Set Computer) processor.

In one implementation, the processor 1010 is a single-threaded processor. In some implementations, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In some implementations, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In some implementations, the input/output device 1040 includes a display unit for displaying graphical user interfaces.

Certain features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method for determining one or more hydrocarbon production zones in a subterranean reservoir, comprising:
   generating, with one or more hardware processors of a control system, a 3D natural fracture model that includes a 3D discrete fracture network and a brittleness model for a subterranean formation into which a wellbore is formed;
   converting, with the one or more hardware processors, the 3D discrete fracture network into a 2D model to determine a continuous fracture density property;
   predicting, with the one or more hardware processors, a plurality of fluid-flow pathways using the continuous fracture density property modeled for each brittleness;
   hydraulically fracturing the wellbore to create one or more hydraulic fractures in the subterranean formation;
   subsequent to the hydraulic fracturing, logging the wellbore to determine one or more logged properties;
   identifying, with the one or more hardware processors, one or more fracture flow zones based on the one or more logged properties;
   validating, with the one or more hardware processors, the predicted plurality of fluid-flow pathways based on the identified one or more fracture flow zones; and
   in response to validating, producing hydrocarbon fluid from the subterranean formation through one or more perforation clusters associated with the identified one or more fracture flow zones.

2. The method of claim 1, wherein the subterranean formation comprises a plurality of natural fractures, and the 3D discrete fracture network comprises the plurality of natural fractures.

3. The method of claim 1, wherein logging the wellbore to determine one or more logged properties comprises:
performing at least one high precision temperature (HPT) logging run to generate at least one HPT log of the wellbore; and
performing at least one spectral noise logging (SNL) run to generate at least one spectral noise log of the wellbore.

4. The method of claim 3, wherein performing at least one spectral noise logging (SNL) run to generate at least one spectral noise log of the wellbore comprises:
performing a first SNL run at flowing conditions of the wellbore to generate a first spectral noise log of the wellbore; and
performing a second SNL run at shut-in conditions of the wellbore to generate a second spectral noise log of the wellbore.

5. The method of claim 1, further comprising:
generating a composite log that includes a fracture density index, the predicted plurality of fluid-flow pathways, the at least one HPT log, and the at least one spectral noise log of the wellbore; and
comparing, with the one or more hardware processors, the predicted plurality of fluid-flow pathways with portions of the at least one HPT log, and the at least one spectral noise log associated with the one or more hydraulic fractures in the subterranean formation.

6. The method of claim 5, wherein comparing the predicted plurality of fluid-flow pathways with portions of the at least one HPT log, and the at least one spectral noise log associated with the one or more hydraulic fractures in the subterranean formation comprises:
matching, with the one or more hardware processors, wellbore depths of the predicted plurality of fluid-flow pathways with wellbore depths on at least one of the HPT log or the spectral noise log that are associated with fluid flow through the one or more hydraulic fractures of the wellbore.

7. The method of claim 5, wherein the predicted plurality of fluid-flow pathways are marked as tadpoles on the composite log.

8. The method of claim 1, further comprising calibrating, with the one or more hardware processors, the plurality of fluid-flow pathways based on the identified one or more fracture flow zones.

9. A computer-implemented method performed with one or more hardware processors, comprising:
generating, with one or more hardware processors of a control system, a 3D natural fracture model that includes a 3D discrete fracture network and a brittleness model for a subterranean formation into which a wellbore is formed;
converting, with the one or more hardware processors, the 3D discrete fracture network into a 2D model to determine a continuous fracture density property;
predicting, with the one or more hardware processors, a plurality of fluid-flow pathways using the fracture density property modeled for each brittleness;
generating, with the one or more hardware processors, one or more logs of one or more logged properties of the wellbore from a completed hydraulic fracturing and logging operation of the wellbore;
identifying, with the one or more hardware processors, one or more fracture flow zones based on the one or more logged properties;
validating, with the one or more hardware processors, the predicted plurality of fluid-flow pathways based on the identified one or more fracture flow zones; and
in response to validating, determining one or more perforation clusters associated with the identified one or more fracture flow zones for production of hydrocarbon fluid from the subterranean formation therethrough.

10. The computer-implemented method of claim 9, wherein the subterranean formation comprises a plurality of natural fractures, and the 3D discrete fracture network comprises the plurality of natural fractures.

11. The computer-implemented method of claim 9, wherein the one or more logs comprise:
at least one high precision temperature (HPT) log of the wellbore such that a first logged property is wellbore fluid temperature; and
at least one spectral noise log of the wellbore such that a second logged property is wellbore fluid spectral noise.

12. The computer-implemented method of claim 11, wherein the at least one spectral noise log of the wellbore comprises:
a first spectral noise log of the wellbore at wellbore flowing fluid conditions; and
a second spectral noise log of the wellbore at wellbore shut-in conditions.

13. The computer-implemented method of claim 9, further comprising:
generating, with the one or more hardware processors, a composite log that includes a fracture density index, the predicted plurality of fluid-flow pathways, the at least one HPT log, and the at least one spectral noise log of the wellbore; and
comparing, with the one or more hardware processors, the predicted plurality of fluid-flow pathways with portions of the at least one HPT log, and the at least one spectral noise log associated with the one or more hydraulic fractures in the subterranean formation.

14. The computer-implemented method of claim 13, wherein comparing the predicted plurality of fluid-flow pathways with portions of the at least one HPT log, and the at least one spectral noise log associated with the one or more hydraulic fractures in the subterranean formation comprises:
matching, with the one or more hardware processors, wellbore depths of the predicted plurality of fluid-flow pathways with wellbore depths on at least one of the HPT log or the spectral noise log that are associated with fluid flow through the one or more hydraulic fractures of the wellbore.

15. The computer-implemented method of claim 13, wherein the predicted plurality of fluid-flow pathways are marked as tadpoles on the composite log.

16. The computer-implemented method of claim 9, further comprises calibrating, with the one or more hardware processors, the plurality of fluid-flow pathways based on the identified one or more fracture flow zones.

17. A computing system, comprising:
one or more memory modules that store instructions; and
one or more hardware processors communicably coupled to the one or more memory modules and configured to execute the instructions to perform operations, comprising:

generating a 3D natural fracture model that includes a 3D discrete fracture network and a brittleness model for a subterranean formation into which a wellbore is formed;

converting the 3D discrete fracture network into a 2D model to determine a continuous fracture density property;

predicting a plurality of fluid-flow pathways using the fracture density property modeled for each brittleness;

generating one or more logs of one or more logged properties of the wellbore from a completed hydraulic fracturing and logging operation of the wellbore;

identifying one or more fracture flow zones based on the one or more logged properties;

validating the predicted plurality of fluid-flow pathways based on the identified one or more fracture flow zones; and in response to validating, determining one or more perforation clusters associated with the identified one or more fracture flow zones for production of hydrocarbon fluid from the subterranean formation therethrough.

18. The computing system of claim 17, wherein the subterranean formation comprises a plurality of natural fractures, and the 3D discrete fracture network comprises the plurality of natural fractures.

19. The computing system of claim 17, wherein the one or more logs comprise:
   at least one high precision temperature (HPT) log of the wellbore such that a first logged property is wellbore fluid temperature; and
   at least one spectral noise log of the wellbore such that a second logged property is wellbore fluid spectral noise.

20. The computing system of claim 19, wherein the at least one spectral noise log of the wellbore comprises:
   a first spectral noise log of the wellbore at wellbore flowing fluid conditions; and
   a second spectral noise log of the wellbore at wellbore shut-in conditions.

21. The computing system of claim 19, wherein the operations further comprise calibrating the validated plurality of fluid-flow pathways based on the identified one or more fracture flow zones.

22. The computing system of claim 17, wherein the operations further comprise:
   generating a composite log that includes a fracture density index, the predicted plurality of fluid-flow pathways, the at least one HPT log, and the at least one spectral noise log of the wellbore; and
   comparing the predicted plurality of fluid-flow pathways with portions of the at least one HPT log, and the at least one spectral noise log associated with the one or more hydraulic fractures in the subterranean formation.

23. The computing system of claim 22, wherein the operation of comparing the predicted plurality of fluid-flow pathways with portions of the at least one HPT log, and the at least one spectral noise log associated with the one or more hydraulic fractures in the subterranean formation comprises:
   matching wellbore depths of the predicted plurality of fluid-flow pathways with wellbore depths on at least one of the HPT log or the spectral noise log that are associated with fluid flow through the one or more hydraulic fractures of the wellbore.

24. The computing system of claim 22, wherein the predicted plurality of fluid-flow pathways are marked as tadpoles on the composite log.

* * * * *